(12) United States Patent
Akhlaghi et al.

(10) Patent No.: US 11,891,493 B2
(45) Date of Patent: Feb. 6, 2024

(54) STABILIZED COLLOIDAL APHRON/GRAPHENE DERIVATIVES HYBRID FLUIDS

(71) Applicants: Mohammad Hossein Akhlaghi, Tehran (IR); Malek Naderi, Tehran (IR)

(72) Inventors: Mohammad Hossein Akhlaghi, Tehran (IR); Malek Naderi, Tehran (IR)

(73) Assignees: AMIRKABIR UNIVERSITY OF TECHNOLOGY, Tehran (IR); Mohammad Hossein Akhlaghi, Tehran (IR); Malek Naderi, Tehran (IR)

( * ) Notice: Subject to any disclaimer, the term of this patent is extended or adjusted under 35 U.S.C. 154(b) by 0 days.

(21) Appl. No.: 17/488,272

(22) Filed: Sep. 28, 2021

(65) Prior Publication Data

US 2022/0017720 A1    Jan. 20, 2022

Related U.S. Application Data

(60) Provisional application No. 63/162,073, filed on Mar. 17, 2021.

(51) Int. Cl.
*C08K 3/04* (2006.01)
*C08L 5/00* (2006.01)

(52) U.S. Cl.
CPC ............ *C08K 3/042* (2017.05); *C08L 5/00* (2013.01); *C08L 2207/53* (2013.01)

(58) Field of Classification Search
CPC .................................. C08K 3/042; C08J 3/02
See application file for complete search history.

(56) References Cited

U.S. PATENT DOCUMENTS

2015/0129809 A1* 5/2015 Gauthy ................. C08K 3/042
                                                    252/511
2018/0305570 A1* 10/2018 El-Kady ................ C09D 11/08

* cited by examiner

*Primary Examiner* — Wenwen Cai
(74) *Attorney, Agent, or Firm* — Bajwa IP Law Firm; Haris Zaheer Bajwa

(57) ABSTRACT

A method for producing a colloidal aphron/graphene hybrid fluid composition. The method may include forming a first mixture by mixing a graphene oxide aqueous solution and a biopolymer solution. The method may further include forming a second mixture by mixing the first mixture with at least an ionic-surfactant solution and a non-ionic surfactant solution.

5 Claims, 13 Drawing Sheets

100

```
┌─────────────────────────────────────────────────┐
│ Forming a first mixture by mixing a graphene derivative │
│ solution and a biopolymer solution.             │──102
└─────────────────────────────────────────────────┘
                         │
                         ▼
┌─────────────────────────────────────────────────┐
│ Forming a second mixture by mixing at least an ionic-surfactant │
│ solution and a non-ionic surfactant solution with the first │──104
│ mixture.                                        │
└─────────────────────────────────────────────────┘
```

STABILIZED COLLOIDAL APHRON/GRAPHENE DERIVATIVES HYBRID FLUIDS

CROSS-REFERENCE TO RELATED APPLICATION

This application claims the benefit of priority from U.S. Provisional Patent Application Ser. No. 63/162,073, filed on Mar. 17, 2021, and entitled "HYBRID NANOFLUID BASED ON COLLOIDAL APHRON AND GRAPHENE OXIDE/REDUCED GRAPHENE OXIDE HYDROGEL," which is incorporated herein by reference in its entirety.

TECHNICAL FIELD

The present disclosure relates to stabilizing colloidal aphron fluids, and more particularly relates to stabilizing colloidal aphron fluids utilizing reduced graphene oxide.

BACKGROUND

Colloidal gas aphrons (CGAs) are core-shell structure of gases stabilized by a polymer/surfactant shell. The shell of aphrons is originally made of multilayered surfactants or polymers, in which water molecules may be trapped inside layers of surfactants or polymers. Multilayer structure of surfactants surrounding the gaseous core may enhance stabilization of aphrons in comparison to ordinary bubbles in a liquid with a single layer of surfactant molecules.

CGAs have high interfacial area and relatively high stability which make them good candidates for different applications, such as biotechnology, separation industry, membranes, and smart-fluid technology. High interfacial area per unit volume enables CGAs to absorb molecules for separation applications. Furthermore, CGAs are able to withstand a pressure up to 200 bar which is about ten times higher than the pressure which conventional bubbles can endure.

CGAs are dynamically structured systems which are continuously transforming due to bubble breakage, coalescence, and disproportionation. As used herein, disproportionation refers to a mechanism of transforming small bubbles with a high internal gas pressure to larger bubbles with a lower internal gas pressure. Various factors may affect stability of CGAs, such as shell thickness, shell viscosity, type of the surfactant, and concentration of the surfactant. CGAs have to maintain stability to guarantee their industrial applications.

Different strategies may be used to enhance stability and control the size of CGAs, such as controlling the surfactant concentration close to critical micelle concentration (CMC) and increasing chain length of the alkyl group of the surfactant which may reduce CMC and therefore increase stability of CGAs. Although these methods may enhance stability of CGAs, a more effective approach is required to maintain stability of CGAs for a longer period of time and also control size distribution of CGAs.

There is, therefore, a need for a stable CGA with a narrow size distribution. There is further a need for developing a method for producing a CGA with high surface area and active sites.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for producing a colloidal aphron/graphene hybrid fluid composition. An exemplary method may include forming a first mixture by mixing a graphene derivative solution and a biopolymer solution. An exemplary biopolymer may include at least one of polyvinyl alcohol, carboxymethylcellulose, starch and starch derivatives, chitosan, hyaluronan, xanthan, hydroxypropyl cellulose, polyethylene glycol, polyanionic cellulose, poly(vinyl pyridine), hydrolyzed polyacrylamide, poly(acrylic acid), polyoxyethylene-polyoxypropylene block copolymer, and polyacrylamide. An exemplary graphene derivative may include at least one of graphene oxide, graphene nano plates, carboxylic acid-functionalized graphene, amine-functionalized graphene, hydroxyl-functionalized graphene, poly(ethylene glycol)-functionalized graphene, and sulfonic-functionalized graphene. An exemplary method may further include mixing an exemplary first mixture with at least one of an ionic-surfactant solution and a non-ionic surfactant solution. An exemplary ionic-surfactant solution may include at least one of sodium lauryl ether sulfate, linear alkylbenzene sulfonic acid, sodium dodecyl sulfate, sodium dodecylbenzene sulfonate, dodecyltrimethylammonium bromide, and cetyltrimethylammonium bromide, and an exemplary non-ionic surfactant solution may include at least one of polyoxyethylene sorbitan monolaurate, polyoxyethylene sorbitan monopalmitate, polyoxyethylene sorbitan monostearate, polyoxyethylene sorbitan monooleate, sorbitan monolaurate, sorbitan monopalmitate, sorbitan monostearate, sorbitan monooleate, polyoxyethylene octyl phenyl ether, and nonylphenol ethoxylates.

In an exemplary embodiment, forming an exemplary first mixture may include forming an exemplary graphene oxide aqueous solution by mixing an exemplary graphene oxide and water in an ultrasonic device with an ultrasonic power in a range of 50 W to 100 W for 10 minutes to 30 minutes.

In an exemplary embodiment, forming an exemplary first mixture may include forming an exemplary graphene oxide aqueous solution with a concentration of an exemplary graphene oxide aqueous solution in a range of 2 mg/mL to 12 mg/mL.

In an exemplary embodiment, forming an exemplary first mixture may include forming an exemplary biopolymer solution by mixing a biopolymer with water in a mixer with a rotational speed of an exemplary mixer in a range of 300 rpm to 500 rpm for 60 minutes to 90 minutes.

In an exemplary embodiment, forming an exemplary first mixture may include mixing an exemplary graphene oxide aqueous solution and an exemplary biopolymer solution in an exemplary mixer with a rotational speed of an exemplary mixer in a range of 300 rpm to 500 rpm for 30 minutes to 60 minutes.

In an exemplary embodiment, forming an exemplary first mixture may include mixing an exemplary graphene oxide aqueous solution and an exemplary biopolymer solution in a volume ratio in a range of 1:0.45 to 1:0.9 (graphene oxide aqueous solution:biopolymer solution).

In an exemplary embodiment, forming an exemplary second mixture may further include forming an exemplary ionic-surfactant solution by mixing an exemplary ionic surfactant and water with a concentration of an exemplary ionic-surfactant solution in a range of 0.5 mg/mL to 7 mg/mL.

In an exemplary embodiment, forming an exemplary second mixture may further include forming an exemplary non-ionic surfactant solution by mixing an exemplary non-ionic surfactant and water with a concentration of an exemplary non-ionic surfactant solution in a range of 0.2 mg/mL to 5 mg/mL.

In an exemplary embodiment, forming an exemplary second mixture may include mixing an exemplary first mixture with at least an exemplary ionic-surfactant solution and an exemplary non-ionic surfactant solution in an exemplary mixer with a rotational speed in a range of 300 rpm to 500 rpm for 10 minutes to 15 minutes.

In an exemplary embodiment, producing an exemplary colloidal aphron/graphene hybrid fluid composition may further include forming a third mixture by mixing an exemplary second mixture containing graphene oxide with a reducing agent solution. An exemplary reducing agent solution may include sodium hydroxide, an ammonia solution, an ascorbic acid solution, sodium bisulfite, hydrazine hydrate, and vitamin C.

In an exemplary embodiment, forming an exemplary third mixture may further include forming an exemplary reducing agent solution by mixing an exemplary reducing agent and water with a concentration of an exemplary reducing agent solution in a range of 4 mg/mL to 144 mg/mL.

In an exemplary embodiment, forming an exemplary third mixture may include mixing an exemplary second mixture with an exemplary reducing agent solution in a volume ratio in a range of 1:0.011 to 1:0.059 (second mixture:reducing agent solution).

According to one or more exemplary embodiments, the present disclosure is directed to a colloidal aphron/graphene hybrid fluid composition. An exemplary colloidal aphron/graphene hybrid fluid composition may include a graphene derivative. An exemplary graphene derivative may include at least one of graphene oxide, graphene nano plates, carboxylic acid-functionalized graphene, amine-functionalized graphene, hydroxyl-functionalized graphene, poly(ethylene glycol)-functionalized graphene, and sulfonic-functionalized graphene. An exemplary colloidal aphron/graphene hybrid fluid composition may further include a biopolymer. An exemplary biopolymer may include at least one of polyvinyl alcohol, carboxymethylcellulose, starch and starch derivatives, chitosan, hyaluronan, xanthan, hydroxypropyl cellulose, polyethylene glycol, polyanionic cellulose, poly(vinyl pyridine), hydrolyzed polyacrylamide, poly(acrylic acid), polyoxyethylene-polyoxypropylene block copolymer, and polyacrylamide. An exemplary colloidal aphron/graphene hybrid fluid composition may further include a surfactant. An exemplary surfactant may include at least one of polyoxyethylene sorbitan monolaurate, polyoxyethylene sorbitan monopalmitate, polyoxyethylene sorbitan monostearate, polyoxyethylene sorbitan monooleate, sorbitan monolaurate, sorbitan monopalmitate, sorbitan monostearate, sorbitan monooleate, polyoxyethylene octyl phenyl ether, nonylphenol ethoxylates, sodium dodecyl sulfate, sodium dodecylbenzene sulfonate, dodecyltrimethyl ammonium bromide, and cetyltrimethylammonium bromide. In an exemplary embodiment, an exemplary colloidal aphron/graphene hybrid fluid composition may further include water.

In an exemplary embodiment, an exemplary colloidal aphron/graphene hybrid fluid composition may further include a reducing agent may be configured to be mixed with an exemplary graphene oxide aqueous solution. An exemplary reducing agent may include at least one of sodium hydroxide, an ammonia solution, an ascorbic acid solution, sodium bisulfite, hydrazine hydrate, and vitamin C.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which:

FIG. 1 illustrates a flowchart of a method for producing a colloidal aphron/graphene hybrid fluid composition, consistent with one or more exemplary embodiments of the present disclosure;

DETAILED DESCRIPTION

Figure 2:
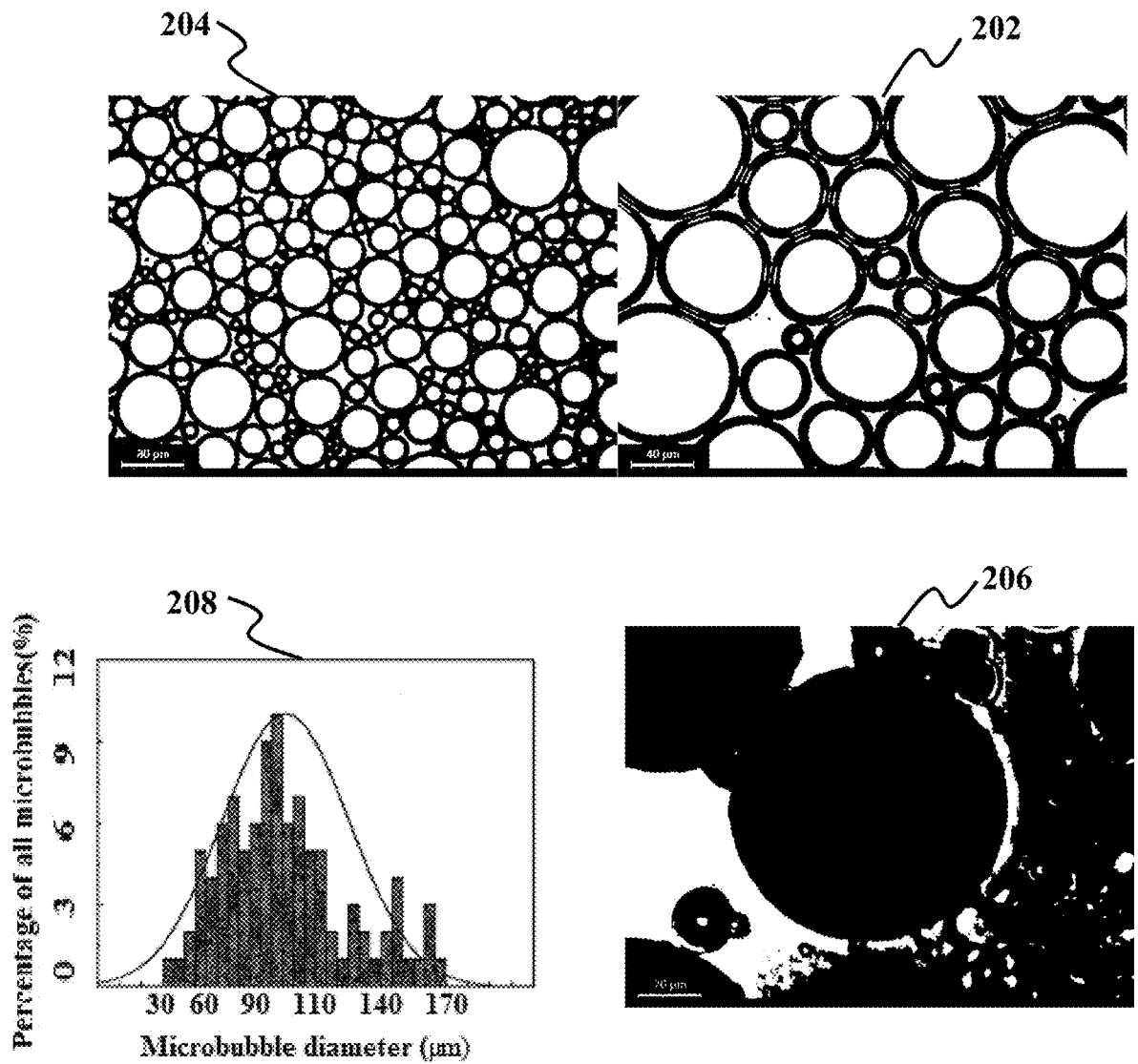
FIG. 2 illustrates optical microscope images of aphrons without graphene derivatives and size distribution diagram of aphrons, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a colloidal aphron/graphene hybrid fluid composition with an average particle size of aphrons in a range of 5 μm to 50 μm. An exemplary colloidal aphron/graphene hybrid fluid composition may include a biopolymer, a surfactant, a graphene derivative, a gas or a liquid, and water. As used herein, aphrons may refer to particles with a core-sell structure in which gases or liquids may form an exemplary core and surfactants and a biopolymer solution may form an exemplary shell. An exemplary graphene derivative may be formed on an outer surface of an exemplary shell to stabilize exemplary aphrons. An exemplary graphene derivative may include at least one of graphene oxide, graphene nano plates, carboxylic acid-functionalized graphene, amine-functionalized graphene, hydroxyl-functionalized graphene, poly(ethylene glycol)-functionalized graphene, and sulfonic-functionalized graphene. In an exemplary embodiment, exemplary graphene nano plates may include plates each with a thickness between 1 nm to 3 nm and with a lateral dimension to 100 μm. In an exemplary embodiment, exemplary gases may include at least one of oxygen, nitrogen, argon, and carbon dioxide and exemplary liquids may include at least one of a liquid paraffin, n-hexane, an oleic acid, a castor oil, and a tallow oil. An exemplary shell of aphrons with an average thickness in a range of 1 μm to 20 μm may include a three-layer structure. An exemplary shell of aphrons may include a single layer of surfactants, a biopolymer solution, and a bilayer structure of surfactants. An exemplary bilayer structure of surfactants may improve penetration resistivity of exemplary aphrons. An exemplary penetration resistivity may include a resistivity for penetration of exemplary gases or exemplary liquids to the outside of exemplary aphrons.

To stabilize exemplary aphrons in a fluid, graphene oxide may be used as a hydrogel to enhance stability of exemplary aphrons. Hydrophobic hexagonal carbon structure of graphene oxide and hydrophilic oxygen functional groups may form a hydrogel over an exemplary shell of an exemplary aphron. An exemplary hydrogel formed over an exemplary shell of an exemplary aphron may stabilize exemplary aphrons. Graphene oxide may be reduced to form partially reduced graphene oxide utilizing a reducing agent. Partially reduced graphene oxide may be formed on an exemplary outer surface of an exemplary shell of exemplary aphrons. Partially reduced graphene oxide may also include hexagonal carbon structure and hydrophilic oxygen functional groups to stabilize exemplary aphrons. An exemplary partially reduced graphene oxide may include less oxygen-functionalized groups than an exemplary graphene oxide. Forming a hydrogel over exemplary aphrons may inhibit agglomeration of exemplary aphrons. An exemplary partially reduced graphene oxide may be reduced in a range of 20% to 85%, utilizing an exemplary reducing agent.

According to one or more exemplary embodiments, the present disclosure is further directed to exemplary embodiments of a method for producing an exemplary colloidal aphron/graphene hybrid fluid composition. A first mixture may be prepared by mixing a graphene derivative solution with a biopolymer solution in a mixer at room temperature and atmospheric pressure. To form an exemplary first mixture, an exemplary graphene derivative solution and an exemplary biopolymer solution may be prepared initially. An exemplary graphene derivative solution may include at least one of graphene oxide, graphene nano plates, carboxylic acid-functionalized graphene, amine-functionalized graphene, hydroxyl-functionalized graphene, poly(ethylene glycol)-functionalized graphene, and sulfonic-functionalized graphene. An exemplary graphene oxide aqueous solution with a concentration in a range of 2 mg/mL to 12 mg/mL may be prepared by mixing graphene oxide and water in an exemplary mixer. Moreover, an exemplary biopolymer solution with a concentration in a range of 0.5 mg/mL to 10 mg/mL may also be prepared by mixing a biopolymer with water in an exemplary mixer. In an exemplary embodiment, 1-8.4 wt. % of an exemplary graphene derivative to a total weight of an exemplary colloidal aphron/graphene hybrid fluid composition may be used to form an exemplary first mixture.

After preparing an exemplary first mixture, at least one of an ionic-surfactant solution and a non-ionic surfactant solution may be added to an exemplary first mixture to form a second mixture. To obtain an exemplary second mixture, an exemplary ionic-surfactant solution or an exemplary non-ionic surfactant solution may be prepared initially. An ionic surfactant and water may be mixed in an exemplary mixer to form an exemplary ionic-surfactant solution with a concentration in a range of 0.5 mg/mL to 7 mg/mL. An exemplary ionic surfactant may include at least one of sodium dodecyl sulfate, sodium dodecylbenzene sulfonate, dodecyltrimethylammonium bromide, and cetyltrimethylammonium bromide. Furthermore, a non-ionic surfactant solution with a concentration in a range of 0.2 mg/mL to 5 mg/mL may be added to an exemplary first mixture. An exemplary non-ionic surfactant may include at least one of polyoxyethylene sorbitan monolaurate, polyoxyethylene sorbitan monopalmitate, polyoxyethylene sorbitan monostearate, polyoxyethylene sorbitan monooleate, sorbitan monolaurate, sorbitan monopalmitate, sorbitan monostearate, sorbitan monooleate, polyoxyethylene octyl phenyl ether, and nonylphenol ethoxylates.

When using graphene oxide aqueous solution to from an exemplary first mixture an additional step may be required. An exemplary additional step may include adding a reducing agent solution to an exemplary second mixture to form a third mixture. An exemplary reducing agent solution may be added when an exemplary graphene oxide aqueous solution is used to form an exemplary first mixture. An exemplary reducing agent solution with a concentration in a range of 4 mg/mL to 144 mg/mL may be added to an exemplary second mixture to reduce graphene oxide. An exemplary reducing agent may include at least one of sodium hydroxide, an ammonia solution, an ascorbic acid solution, sodium bisulfite, hydrazine hydrate, and vitamin C. An exemplary graphene oxide may be reduced partially to have both oxygen functional groups and hexagonal carbon atoms. In an exemplary embodiment, an exemplary partially reduction of graphene oxide may be a reduction in a range of 20% to 85%. Additionally, an exemplary reduced graphene oxide may form a hydrogel which may help exemplary surfactants to stabilize an exemplary aphron.

An exemplary aphron may carry a gas or a liquid. Therefore, to insert gases into exemplary aphrons, after producing an exemplary second mixture (or an exemplary third mixture when using graphene oxide), high speed stirring may be used. After adding an exemplary second mixture (or an exemplary third mixture when using graphene oxide) into a reactor, at least one of oxygen, nitrogen, argon, and carbon dioxide may be injected into an exemplary reactor in the way that there may be a flow of exemplary gases on an exemplary second mixture (or an exemplary third mixture when using graphene oxide). To form an exemplary flow of exemplary gases, an exemplary reactor may include an inlet and an outlet for exemplary gases. Exemplary gases may be injected into an exemplary reactor through an exemplary inlet and exemplary gases may leave an exemplary reactor through an exemplary outlet of an exemplary reactor. An exemplary pressure above exemplary aphrons may be equal to an exemplary atmospheric pressure.

An exemplary second mixture may be mixed with a rotational speed in a range of 4000 rpm to 6000 rpm. Mixing an exemplary second mixture may help exemplary gases to penetrate into exemplary aphrons. As a result, exemplary aphrons with trapped gases inside a shell may be produced. After rotating for 3 minutes to 6 minutes, an exemplary second mixture may be heated at a temperature in a range of 50° C. to 75° C. Exemplary graphene derivatives may be positioned on an exemplary outer surface of an exemplary shell of stabilized aphrons. When using graphene oxide to form an exemplary first mixture, applying an exemplary temperature to an exemplary third mixture may enhance an exemplary reducing process of graphene oxide. An exemplary reducing reaction of graphene oxide may be kinetically dependent on temperature. In other words, an exemplary reducing reaction of graphene oxide may be accelerated in response to the increase of temperature. Heating graphene oxide may facilitate opening bonds between oxygen atoms and carbon atoms of graphene oxide.

FIG. 1 illustrates a flowchart of a method 100 for producing a colloidal aphron/graphene hybrid fluid composition, consistent with one or more exemplary embodiments of the present disclosure. In an exemplary embodiment, method 100 may include a step 102 of forming a first mixture by mixing a graphene derivative solution and a biopolymer solution, and a step 104 of forming a second mixture by mixing at least an ionic-surfactant solution and a non-ionic surfactant solution with the first mixture.

In an exemplary embodiment, step 102 of forming the first mixture may include obtaining the graphene derivative solution. In an exemplary embodiment, graphene derivative solution may include graphene oxide, graphene nano plates, carboxylic acid-functionalized graphene, amine-functionalized graphene, hydroxyl-functionalized graphene, poly(ethylene glycol)-functionalized graphene, and sulfonic-functionalized graphene. In an exemplary embodiment, to prepare an exemplary graphene derivative solution, graphene oxide and water may be mixed in an ultrasonic device with a power of an exemplary ultrasonic device in a range of 100 W to 300 W for 10 minutes to 30 minutes. As used herein an exemplary ultrasonic device may be an ultrasonic probe. After mixing graphene oxide with water with a concentration in a range of 2 mg/mL to 12 mg/mL, an exemplary mixture of graphene oxide and water may be mixed again utilizing an ultrasonic device with a power of between 300 W and 400 W for 30 minutes to 60 minutes. As used herein an exemplary ultrasonic device may be an ultrasonic bath. In an exemplary embodiment, mixing graphene oxide and water may be performed in a temperature range of less than 10° C. In an exemplary embodiment an exemplary water may be a deionized water. In an exemplary embodiment, an exemplary graphene oxide may be at least a single layer graphene oxide and a multilayer graphene oxide. In an exemplary embodiment, exemplary graphene nano plates may include plates each with a thickness between 1 nm to 3 nm and with a lateral dimension to 100 μm.

In an exemplary embodiment, step 102 of forming the first mixture may further include obtaining or forming an exemplary biopolymer solution. In an exemplary embodiment, to prepare an exemplary biopolymer solution, a biopolymer and water may be mixed in a mixer with a rotational speed in a range of 300 rpm to 500 rpm for 60 minutes to 90 minutes. In an exemplary embodiment an exemplary biopolymer solution may have a concentration in a range of 0.5 mg/mL to 10 mg/mL. In an exemplary embodiment, an exemplary biopolymer may include at least one of polyvinyl alcohol, carboxymethylcellulose, starch and starch derivatives, chitosan, hyaluronan, xanthan, hydroxypropyl cellulose, polyethylene glycol, polyanionic cellulose, poly(vinyl pyridine), hydrolyzed polyacrylamide, poly(acrylic acid), polyoxyethylene-polyoxypropylene block copolymer, and polyacrylamide. In an exemplary embodiment, an exemplary biopolymer may need thermal energy to dissolve in water. To this end, a reflux system may be used to mix an exemplary biopolymer and water. As used herein, an exemplary reflux system may be a condenser connected to a container in which flow of water in an exemplary condenser may liquefy steam water and therefore, an exemplary concentration of an exemplary biopolymer solution may remain constant. In an exemplary embodiment, an exemplary biopolymer solution may be heated in a temperature range of between 60° C. and 80° C. for 60 minutes to 90 minutes. In an exemplary embodiment, such biopolymers that may need thermal energy to dissolve in water may include at least one of polyvinyl alcohol, carboxymethylcellulose, chitosan, hyaluronan, xanthan, and poly(vinyl pyridine).

In an exemplary embodiment, step 102 of forming the first mixture may further include adding an exemplary biopolymer solution to an exemplary graphene derivative solution with an addition rate in a range of 2.5 mL/min to 4 mL/min. When using graphene oxide, an exemplary biopolymer solution may be mixed with an exemplary graphene oxide aqueous solution in an exemplary mixer with a rotational speed in a range of 300 to 500 rpm for 30 minutes to 60, while adding an exemplary biopolymer solution to an exemplary graphene oxide aqueous solution. In an exemplary embodiment, an exemplary graphene oxide aqueous solution may be mixed with an exemplary biopolymer solution in a volume ratio in a range of 1:0.45 to 1:0.9 (graphene oxide aqueous solution:biopolymer solution) at room temperature and atmospheric pressure. In an exemplary embodiment, an exemplary graphene oxide aqueous solution and an exemplary biopolymer solution may include 50-70 v/v % and 30-45 v/v % of a total volume of an exemplary colloidal aphron/graphene hybrid fluid composition, respectively.

In an exemplary embodiment, step 104 of forming the second mixture may include obtaining or forming a respective ionic surfactant solution or a respective non-ionic surfactant solution. In an exemplary embodiment, to prepare an exemplary ionic surfactant solution, an ionic surfactant may be mixed with water in an exemplary mixer with a rotational speed of between 300 rpm and 500 rpm for 10 minutes to 15 minutes. In an exemplary embodiment, an exemplary ionic surfactant may have a concentration in a range of 0.5 mg/mL to 7 mg/mL. In an exemplary embodiment, an exemplary ionic surfactant may include at least one of sodium lauryl ether sulfate, linear alkylbenzene sulfonic acid, sodium dodecyl sulfate, sodium dodecylbenzene sulfonate, dodecyltrimethylammonium bromide, and cetyltrimethylammonium bromide. In an exemplary embodiment, to prepare an exemplary non-ionic surfactant solution, a non-ionic surfactant may be mixed with water in an exemplary mixer with a rotational speed in a range of 300 rpm to 500 rpm for 10 minutes to 15 minutes. In an exemplary embodiment, an exemplary non-ionic surfactant solution may have a concentration in a range of 0.2 mg/mL to 5 mg/mL. In an exemplary embodiment, an exemplary non-ionic surfactant may include at least one of polyoxyethylene sorbitan monolaurate, polyoxyethylene sorbitan monopalmitate, polyoxyethylene sorbitan monostearate, polyoxyethylene sorbitan monooleate, sorbitan monolaurate, sorbitan monopalmitate, sorbitan monostearate, sorbitan monooleate, polyoxyethylene octyl phenyl ether, and nonylphenol ethoxylates.

In an exemplary embodiment, step 104 of forming the second mixture may include adding either an exemplary ionic-surfactant solution or an exemplary non-ionic surfactant solution to an exemplary first mixture with an addition rate in a range of 1.5 mL/min to 3 mL/min. In an exemplary embodiment, an exemplary mixture of an exemplary first mixture and at least one of an exemplary ionic-surfactant solution and an exemplary non-ionic surfactant solution may be mixed in an exemplary mixer with a rotational speed in a range of 300 rpm to 500 rpm for 30 minutes to 60 minutes. In an exemplary embodiment, an exemplary non-ionic surfactant solution may be added to an exemplary first mixture with a weight ratio in a range of 1:0.023 to 1:0.068 (first mixture:non-ionic surfactant solution). In an exemplary embodiment, an exemplary ionic-surfactant solution may be added to an exemplary first mixture with a weight ratio in a range of 1:0.023 to 1:0.068 (first mixture:ionic-surfactant solution). In an exemplary embodiment, an exemplary ionic-surfactant solution and an exemplary non-ionic surfactant solution may include 2-6 v/v % of an exemplary total volume of an exemplary colloidal aphron/graphene hybrid fluid composition.

In an exemplary embodiment, producing a colloidal aphron/graphene hybrid fluid composition may further include forming a third mixture when graphene oxide may be used to form an exemplary first mixture. In an exemplary embodiment, forming an exemplary third mixture may include adding a reducing agent solution to an exemplary second mixture. In an exemplary embodiment, forming an exemplary third mixture may comprise obtaining or forming an exemplary reducing agent solution. To form an exemplary reducing agent solution, a reducing agent may be mixed with water in an exemplary mixer with a rotational speed in a range of 300 rpm to 500 rpm for 1 minute to 10 minutes. In an exemplary embodiment, an exemplary reducing agent with a concentration in a range of 4 mg/mL to 144 mg/mL may include at least one of sodium hydroxide, an ammonia solution, an ascorbic acid solution, sodium bisulfite, hydrazine hydrate, and vitamin C.

In an exemplary embodiment, forming an exemplary third mixture may comprise mixing an exemplary reducing agent solution with an exemplary second mixture containing graphene oxide in an exemplary mixer with a rotational speed in a range of 300 rpm to 500 rpm for 4 minutes to 10 minutes. In an exemplary embodiment, mixing an exemplary reducing agent solution with an exemplary second mixture may be performed at room temperature and atmospheric pressure. In an exemplary embodiment, an exemplary reducing agent may be added to an exemplary second mixture in a volume ratio in a range of 1:0.011 to 1:0.059 (second mixture:reducing agent). In an exemplary embodiment, an exemplary reducing agent solution may include 1-5 v/v % of an exemplary total volume of an exemplary colloidal aphron/graphene hybrid fluid composition.

In an exemplary embodiment, forming an exemplary colloidal aphron/graphene hybrid fluid composition may further include adding an exemplary second mixture or an exemplary third mixture (if graphene oxide was used) into a reactor. As used herein, an exemplary reactor may include a container, a mixer, a heater, a gas inlet, and a gas outlet. In an exemplary embodiment, exemplary gases may be injected into an exemplary reactor utilizing an exemplary gas inlet and may leave an exemplary reactor utilizing an exemplary gas outlet. In an exemplary embodiment, there may be an exemplary gas flow above an exemplary second mixture or an exemplary third mixture in a range of 5 minutes to 10 minutes before mixing an exemplary second mixture or an exemplary third mixture till an exemplary mixing may be done. In an exemplary embodiment, an exemplary gas may flow on an exemplary second mixture or an exemplary third mixture under atmospheric pressure. To insert gases or liquids into an exemplary aphron, one of three exemplary methods may be used, such as mixing at high speed, using ultrasonic power, and applying pressure. In an exemplary embodiment, to insert gases into exemplary aphrons, high speed mixing may be used. In an exemplary embodiment, an exemplary third mixture may be mixed in an exemplary reactor with an initial rotational speed in a range of 100 rpm to 200 rpm. In an exemplary embodiment, after 5 minutes to 8 minutes, an exemplary rotational speed of an exemplary mixer may increase to a range of 4000 rpm to 6000 rpm. In an exemplary embodiment, an exemplary second mixture or an exemplary third mixture may be mixed at a rotational speed in a range of 4000 rpm to 6000 rpm for 3 minutes to 6 minutes to help exemplary gases penetrate into exemplary aphrons. In an exemplary embodiment, an exemplary colloidal aphron/graphene hybrid fluid composition after penetration of exemplary gases into exemplary aphrons may contain in a range of 10 v/v % to 65 v/v % of exemplary gases to an exemplary total volume of an exemplary aphron fluid composition.

In an exemplary embodiment, after an exemplary penetration of exemplary gases into exemplary aphrons, an exemplary third mixture may be heated at a temperature in a range of 50° C. to 75° C. for 60 minutes to 90 minutes. In an exemplary embodiment, while applying thermal energy, an exemplary third mixture may be mixed in an exemplary reactor with a rotational speed in a range of 500 rpm to 1000 rpm for 1 to 4 hours. In an exemplary embodiment, applying thermal energy to an exemplary third mixture may enhance an exemplary reduction process of graphene oxide. In an exemplary embodiment, an exemplary reduction process of graphene oxide may be dependent on temperature. In an exemplary embodiment, an exemplary reduction process of graphene oxide may be accelerated by an increase of temperature. In an exemplary embodiment, an exemplary graphene oxide may be partially reduced from 20% to 85%.

Example 1: Producing a Colloidal Aphron/Graphene Hybrid Fluid Composition (Sample 1)

In this example, a method similar to method 100 may be used to produce a colloidal aphron/graphene hybrid fluid composition. To this end, a graphene oxide aqueous solution with a concentration of 12 mg/mL may be mixed utilizing an ultrasonic device with a power of 100 W for 15 minutes. To prepare the graphene oxide aqueous solution, 50 mL deionized water may be used. The graphene oxide may be produced by modified hummer's method and the temperature may be controlled under 10° C. during the sonication process. After passing 15 minutes, graphene oxide aqueous solution may be placed in an ultrasonic bath for 30 minutes with a power of 300 W at a temperature of lower than 10° C. (step 1). 40 mL of a polysaccharide (xanthan) solution in water with a concentration of 7.5 mg/mL may be heated and refluxed at 60° C. for 1 hour (step 2). The polysaccharide (xanthan) solution may be mixed and when the temperature may reach 25° C., the polysaccharide (xanthan) solution may be added to the graphene oxide solution. The mixture of the polysaccharide (xanthan) solution and the graphene oxide solution may be mixed for 30 minutes with a rotational speed of 500 rpm. The mixture of graphene oxide and the polysaccharide (xanthan) solution may be added to a reactor. 6 mL of a polyoxyethylene sorbitan monolaurate solution with a concentration of 30 mg/mL and 6 mg/mL of a sodium dodecyl benzene sulfonate solution with a concentration of 42 mg/mL may be added for 15 minutes to the mixture of graphene oxide and polysaccharide (xanthan) (step 4). The mixture may be mixed with a rotational speed of 500 rpm. 4 mL of a reducing agent solution may be added with a concentration of 750 mg/mL to the mixture of graphene oxide, xanthan, and surfactants (step 6). The mixture may be mixed for 5 minutes and the rotational speed of the mixer may increase to 4000 rpm and may rotate at that speed for 4 minutes. After high-speed rotation of the mixer, a temperature in a range of 65° C. to 75° C. may be applied for 1 hour for partial reduction of graphene oxide. The mixture may be mixed with a rotational speed of 1000 rpm for 1 hour (step 8). Table 1 illustrates the data of the materials added in every step, consistent with one or more exemplary embodiments of the present disclosure.

TABLE 1

| materials | | Step1 | Step2 | Step4 | Step6 | Overall volume (100 mL) |
|---|---|---|---|---|---|---|
| Graphene oxide | Concentration (mg/mL) | 12 | — | — | — | 6 |
| | Volume (mL) | 50 | — | — | — | — |
| Biopolymer | Concentration (mg/mL) | — | 7.5 | — | — | 3 |
| | Volume (mL) | — | 40 | — | — | — |
| Nonionic surfactant | Concentration (mg/mL) | — | — | 30 | — | 1.8 |
| | Volume (mL) | — | — | 6 | — | — |
| Ionic surfactant | concentration | — | — | 42 | — | 2.52 |
| Reducing agent | concentration | — | — | — | 750 | 30 |
| | volume | — | — | — | 4 | — |

Example 2: Producing a Colloidal Aphron/Graphene Hybrid Fluid Composition (Sample 2)

In this example, a method similar to method 100 may be used to produce a colloidal aphron/graphene hybrid fluid composition. The method is similar to the method for producing the colloidal aphron/graphene hybrid fluid composition of Example 1. The only difference may be in the last step (step 8) of mixing the colloidal aphron/graphene hybrid fluid composition for 2 hours with a rotational speed of 1000 rpm.

Example 3: Producing a Colloidal Aphron/Graphene Hybrid Fluid Composition (Sample 3)

In this example, a method similar to method 100 may be used to produce a colloidal aphron/graphene hybrid fluid composition. The method is similar to the method for producing the colloidal aphron/graphene hybrid fluid composition of Example 1. The only difference may be in the last step (step 8) of mixing the colloidal aphron/graphene hybrid fluid composition for 3 hours with a rotational speed of 1000 rpm.

Example 4: Analysing Prepared Colloidal Aphron/Graphene Hybrid Fluid Compositions In this example, the colloidal aphron/graphene hybrid fluid composition produced according to example 3 is used to prepare samples for analysis. To this end, the sample may be transferred to a cylinder and a pressure of 1 atm for 1, 4, and 8 hours at 25° C. may be applied.

FIG. 2 illustrates optical microscope images of aphrons without graphene derivatives and size distribution diagram of aphrons, consistent with one or more exemplary embodiments of the present disclosure. Image 202, 204, and 206 show aphrons without using graphene derivatives with an average particle size in a range of 32 µm to 155 µm. Image 208 shows size distribution of aphrons and shows that the average particle size of the aphrons is 86.4 µm.

Figure 3:
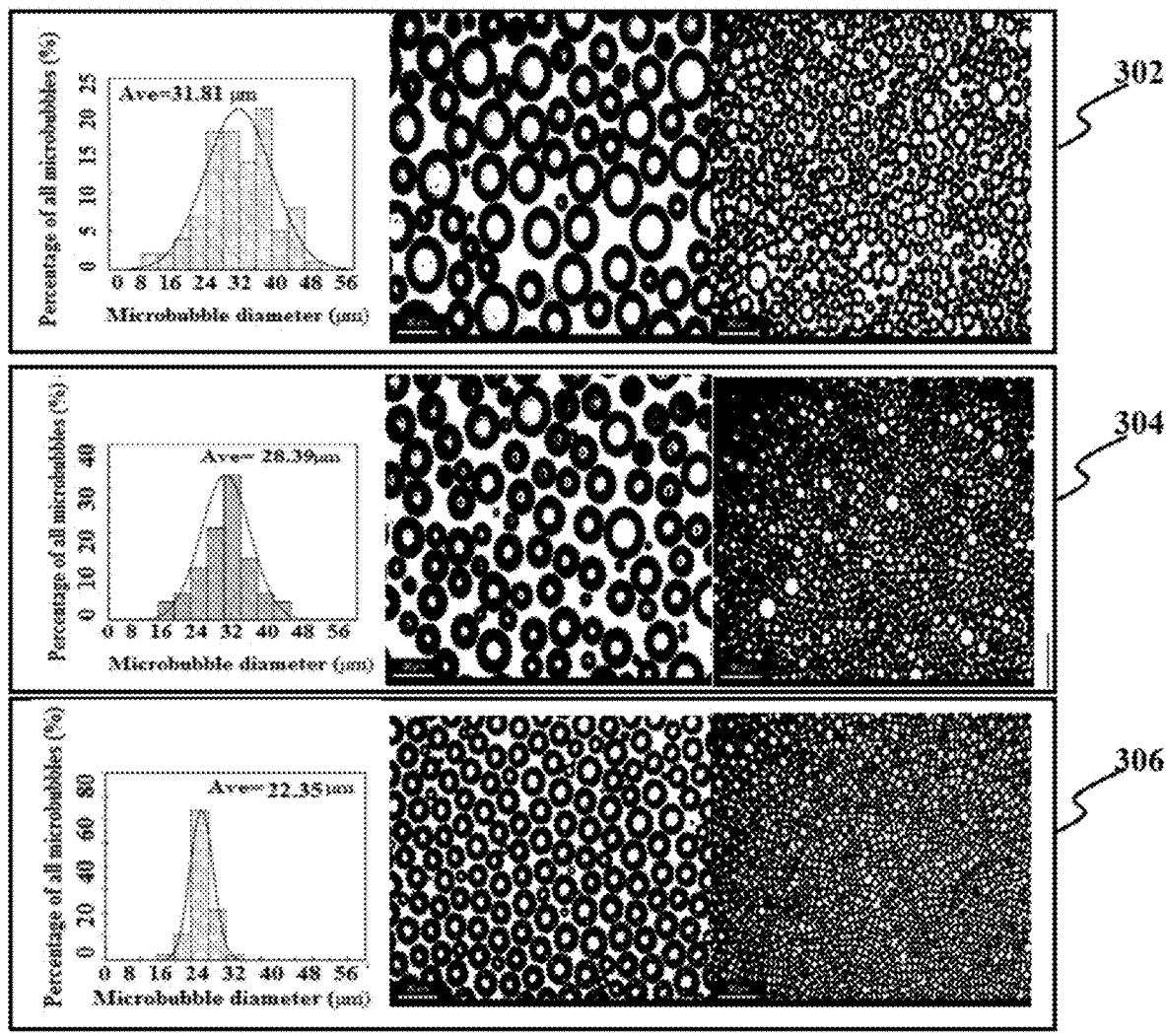
FIG. 3 illustrates optical microscope images and size distribution diagrams of produced colloidal aphron/graphene hybrid fluid compositions using partially reduced graphene oxide, consistent with one or more exemplary embodiments of the present disclosure.

FIG. 3 illustrates optical microscope images and size distribution diagrams of produced colloidal aphron/graphene hybrid fluid compositions using reduced graphene oxide, consistent with one or more exemplary embodiments of the present disclosure. An exemplary reduced graphene oxide may be partially reduced. FIG. 3 shows that size distribution range is narrower and particles are smaller for hybrid colloidal aphron/graphene hybrid fluid compositions in comparison to colloidal aphron/graphene hybrid fluid compositions with no graphene derivatives. Images 302, 304, and 306 show different reduction times of 1 hour, 2 hours, and 3 hours for the hybrid samples 1, 2, and 3, respectively. Results show that after 1 hour of reduction, the average particle size may be 31.8 µm and after 3 hours of reduction the average particle size may decrease to 22.3 µm.

Table 2 illustrates data of a sample with no graphene derivatives (base sample) and three samples of example 1 to 3 with partially reduced graphene oxide and different reduction times, consistent with one or more exemplary embodiments of the present disclosure.

TABLE 2

| sample | Reduction time (hr) | Range of the particle size (μm) | Average particle size (μm) ($\bar{D} \pm SD$) | Average thickness of the shell (μm) ($\bar{t} \pm SD$) |
|---|---|---|---|---|
| Base sample | — | 32-155 | 86.4 ± 29.2 | 4.1 ± 0.5 |
| Sample 1 | 1 | 10-51 | 31.8 ± 8.3 | 7.4 ± 0.7 |
| Sample 2 | 2 | 14-42 | 28.4 ± 5.6 | 6.6 ± 0.6 |
| Sample 3 | 3 | 15-28 | 22.3 ± 2.7 | 5.2 ± 0.5 |

Figure 4:
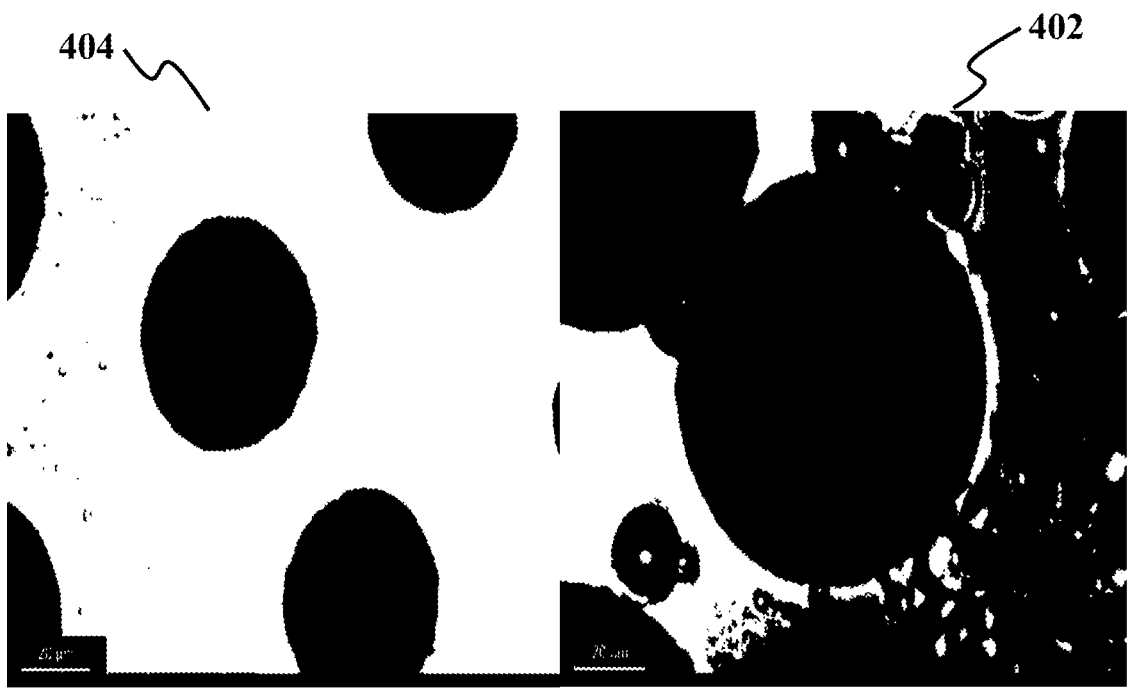
FIG. 4 illustrates optical microscope images of a colloidal aphron/graphene hybrid fluid composition without reduced graphene oxide and a colloidal aphron/graphene hybrid fluid composition with reduced graphene oxide, consistent with one or more exemplary embodiments of the present disclosure.

FIG. 4 illustrates optical microscope images of a colloidal aphron/graphene hybrid fluid composition without reduced graphene oxide and a colloidal aphron/graphene hybrid fluid composition with reduced graphene oxide, consistent with one or more exemplary embodiments of the present disclosure. FIG. 4 shows partially reduced graphene oxide on the shell of aphrons and the formation of hydrogel. Images 402 and 404 show a base sample with no graphene derivatives and sample 3 with reduced graphene oxide, respectively.

Figure 5:
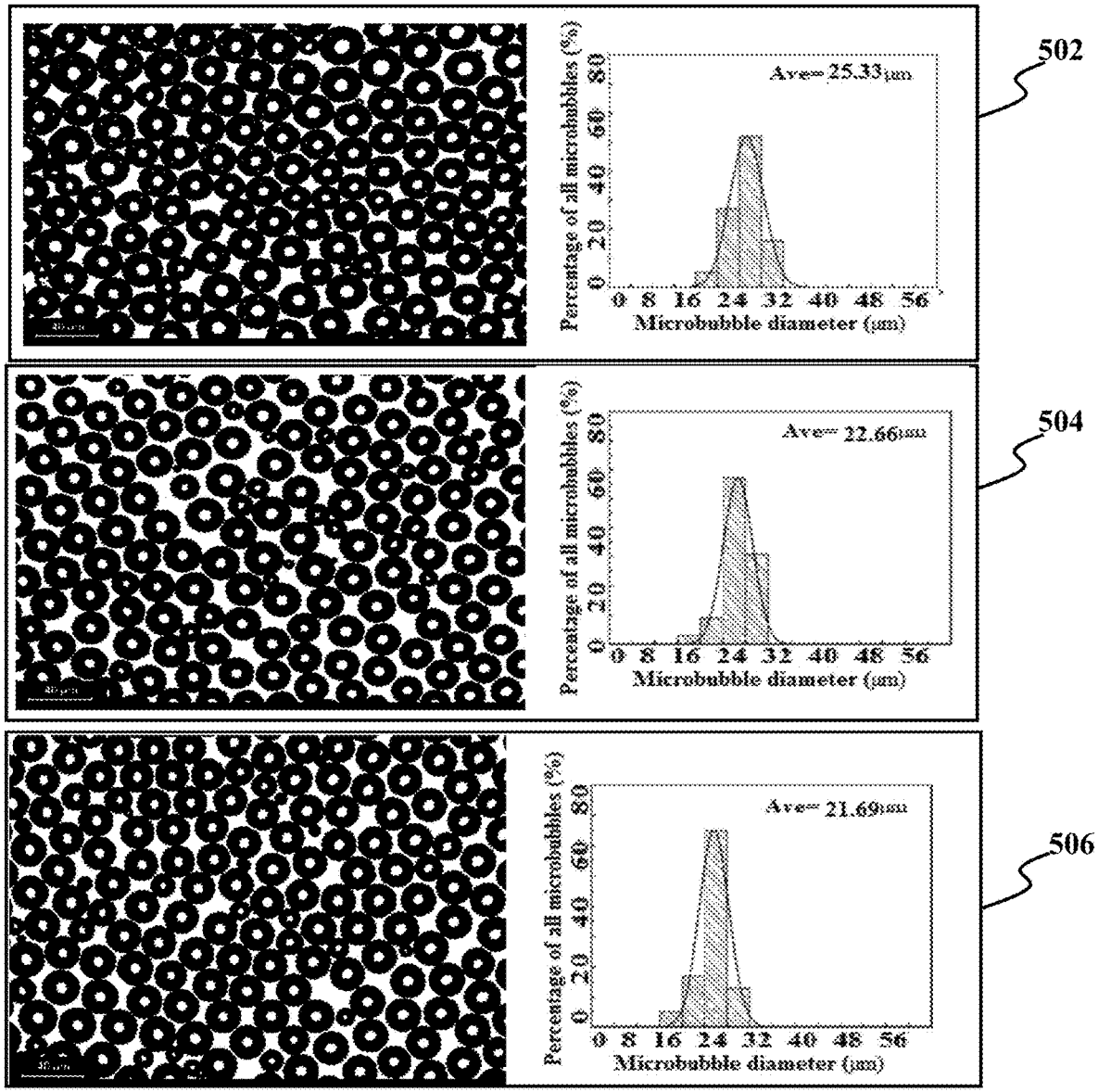
FIG. 5 illustrates optical microscope images and size distribution diagrams of a colloidal aphron/graphene hybrid fluid composition after different times of aging processes, consistent with one or more exemplary embodiments of the present disclosure.

FIG. 5 illustrates optical microscope images and size distribution diagrams of a colloidal aphron/graphene hybrid fluid composition after different times of aging processes, consistent with one or more exemplary embodiments of the present disclosure. FIG. 5 shows effect of the aging process after 1 to 8 hours. The average particle size of aphrons after 8 hours increases from 21.7 μm to 25.3 μm which is still below 30 μm. Images 502, 504, and 506 show the average particle size of aphrons after 8 hours, 4 hours, and 1 hour, respectively.

Figure 6:
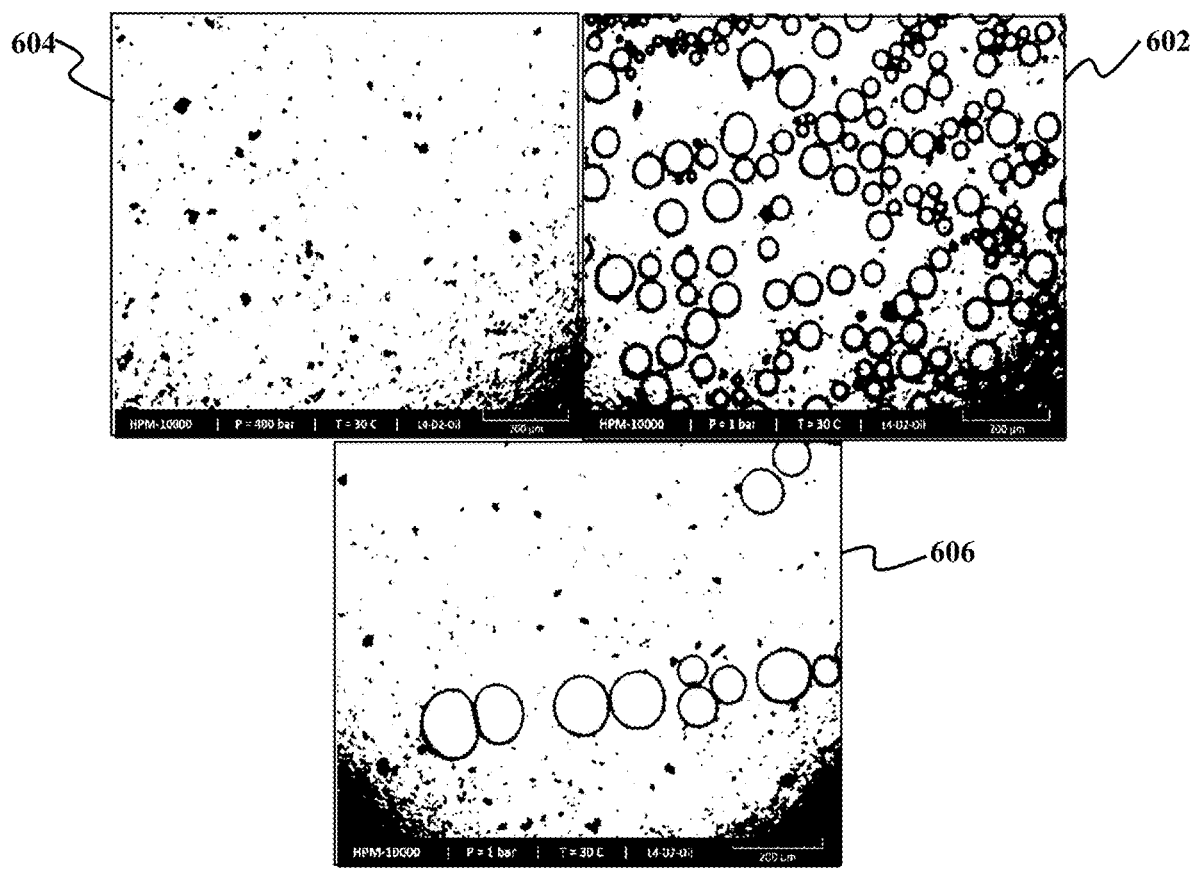
FIG. 6 illustrates high-pressure optical microscope (HPOM) images of a colloidal aphron/graphene hybrid fluid composition without graphene derivatives under a pressure of 400 bar, consistent with one or more exemplary embodiments of the present disclosure.

FIG. 6 illustrates high-pressure optical microscope (HPOM) images of a colloidal aphron/graphene hybrid fluid composition without graphene derivatives under a pressure of 400 bar, consistent with one or more exemplary embodiments of the present disclosure. After applying pressure of 400 bar, the size of micro bubbles may decrease below 1 μm and they may not be visible on the optical microscope and after decompression, most micro bubbles may collapse. Images 602, 604, and 606 show before, during, and after applying pressure to the sample, respectively.

Figure 7:
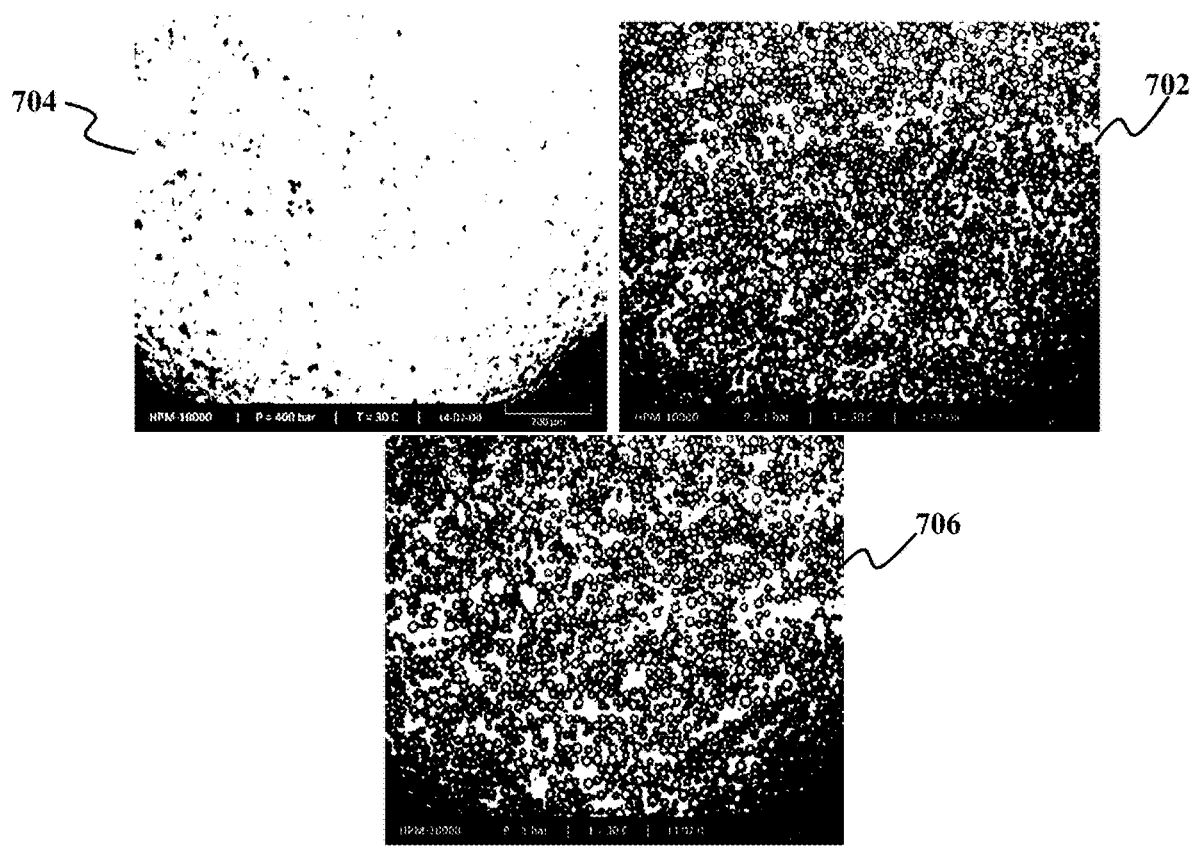
FIG. 7 illustrates HPOM images of a colloidal aphron/graphene hybrid fluid composition with reduced graphene oxide under a pressure of 400 bar, consistent with one or more exemplary embodiments of the present disclosure.

FIG. 7 illustrates HPOM images of a colloidal aphron/graphene hybrid fluid composition with reduced graphene oxide under a pressure of 400 bar, consistent with one or more exemplary embodiments of the present disclosure. After applying pressure of 400 bar, the size of micro bubbles decreases below 1 μm and they may not be visible on the optical microscope. However, after removing the pressure, micro bubbles may form again with a larger size which shows that the produced aphrons have a good resistance to pressure. Images 702, 704, and 706 show before, during, and after applying pressure to the sample, respectively.

Figure 8A:
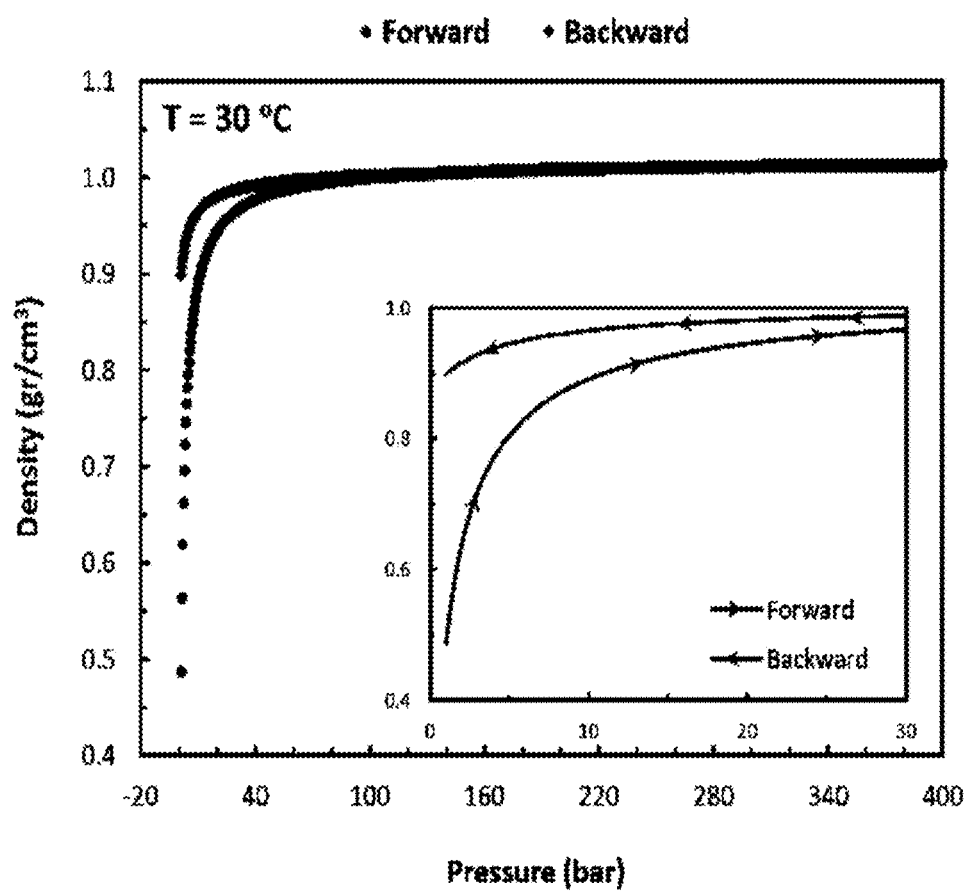
FIG. 8A illustrates an effect of cycling pressure on a density of a colloidal aphron/graphene hybrid fluid composition without graphene derivatives at 30° C., consistent with one or more exemplary embodiments of the present disclosure.
Figure 8B:
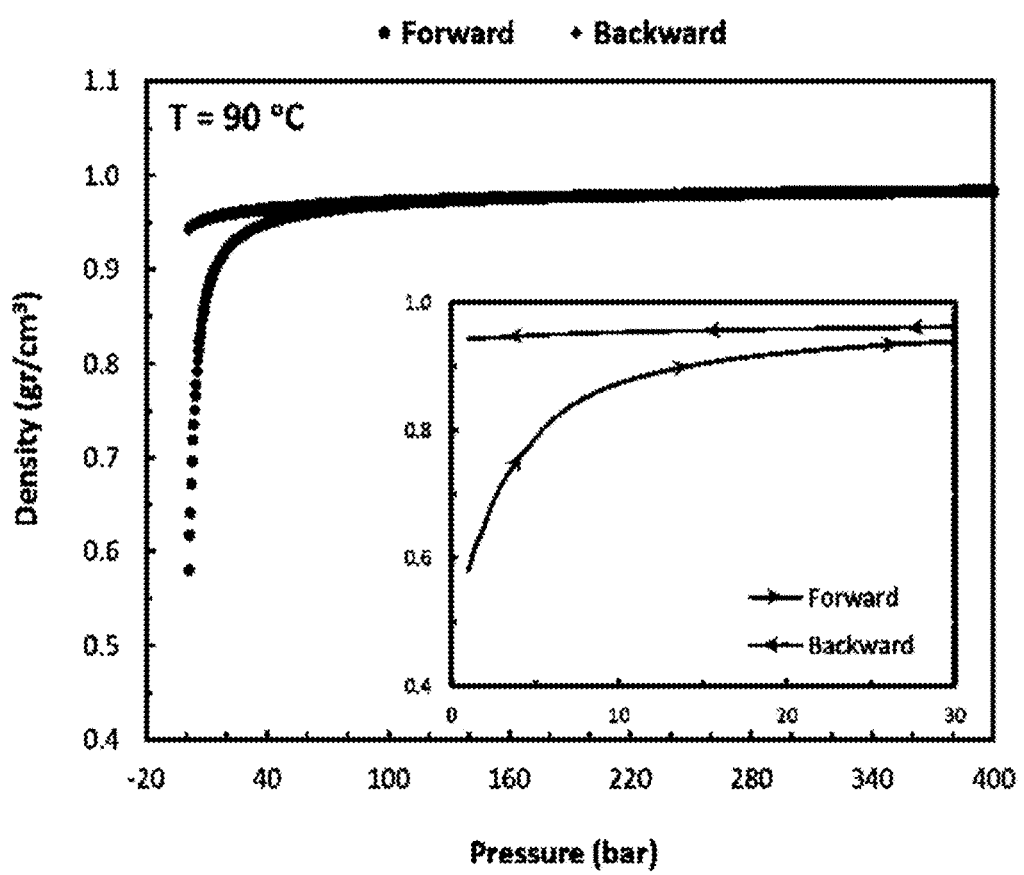
FIG. 8B illustrates an effect of cycling pressure on a density of a colloidal aphron/graphene hybrid fluid composition without graphene derivatives at 90° C., consistent with one or more exemplary embodiments of the present disclosure.
Figure 8C:
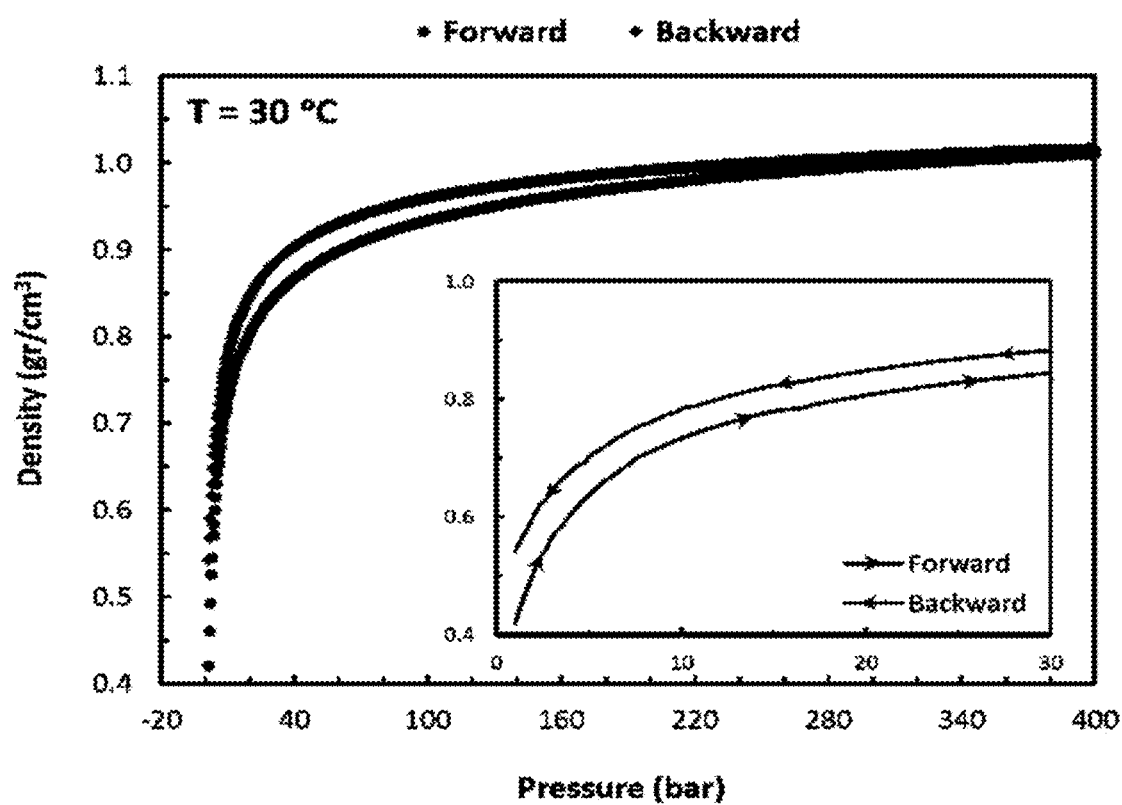
FIG. 8C illustrates an effect of cycling pressure on a density of a colloidal aphron/graphene hybrid fluid composition with partially reduced graphene oxide at 30° C., consistent with one or more exemplary embodiments of the present disclosure.
Figure 8D:
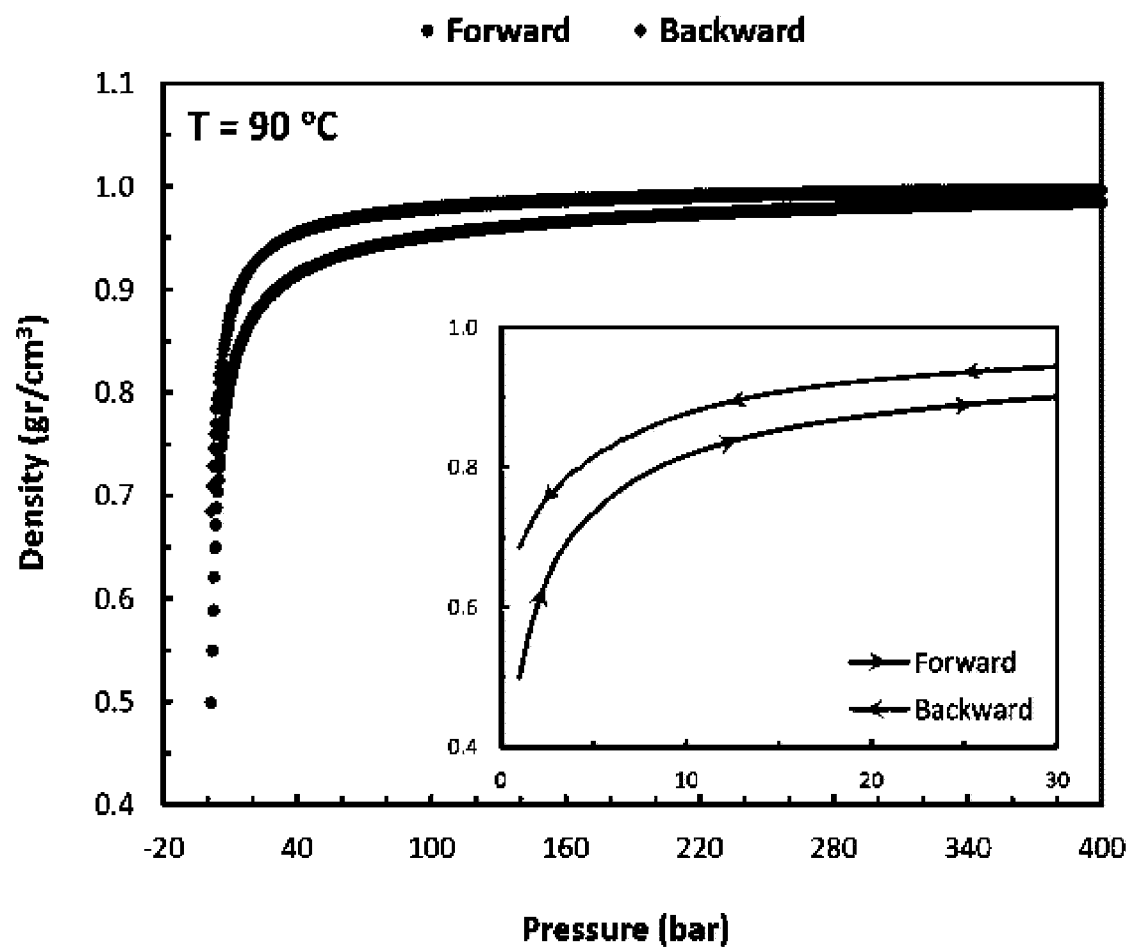
FIG. 8D illustrates an effect of cycling pressure on a density of a colloidal aphron/graphene hybrid fluid composition with partially reduced graphene oxide at 90° C., consistent with one or more exemplary embodiments of the present disclosure.

FIG. 8A illustrates the effect of cycling pressure on the density of a colloidal aphron/graphene hybrid fluid composition without graphene derivatives at 30° C., consistent with one or more exemplary embodiments of the present disclosure. FIG. 8B illustrates the effect of cycling pressure on the density of a colloidal aphron/graphene hybrid fluid composition without graphene derivatives at 90° C., consistent with one or more exemplary embodiments of the present disclosure. FIG. 8C illustrates the effect of cycling pressure on the density of a colloidal aphron/graphene hybrid fluid composition with reduced graphene oxide at 30° C., consistent with one or more exemplary embodiments of the present disclosure. FIG. 8D illustrates the effect of cycling pressure on the density of a colloidal aphron/graphene hybrid fluid composition with reduced graphene oxide at 90° C., consistent with one or more exemplary embodiments of the present disclosure. The cycling pressure may be applied from 1 bar to 400 bar at a temperature in a range of 30° C. to 90° C. The data shows that after applying the cycling pressure, the colloidal aphron/graphene hybrid fluid composition with partially reduced graphene oxide (sample 3) show less density variations in comparison to the colloidal aphron/graphene hybrid fluid composition without graphene derivatives. Recovering the original density after applying high pressure and temperature may be a proof of high stability of the colloidal aphron/graphene hybrid fluid composition with reduced graphene oxide.

Figure 9:
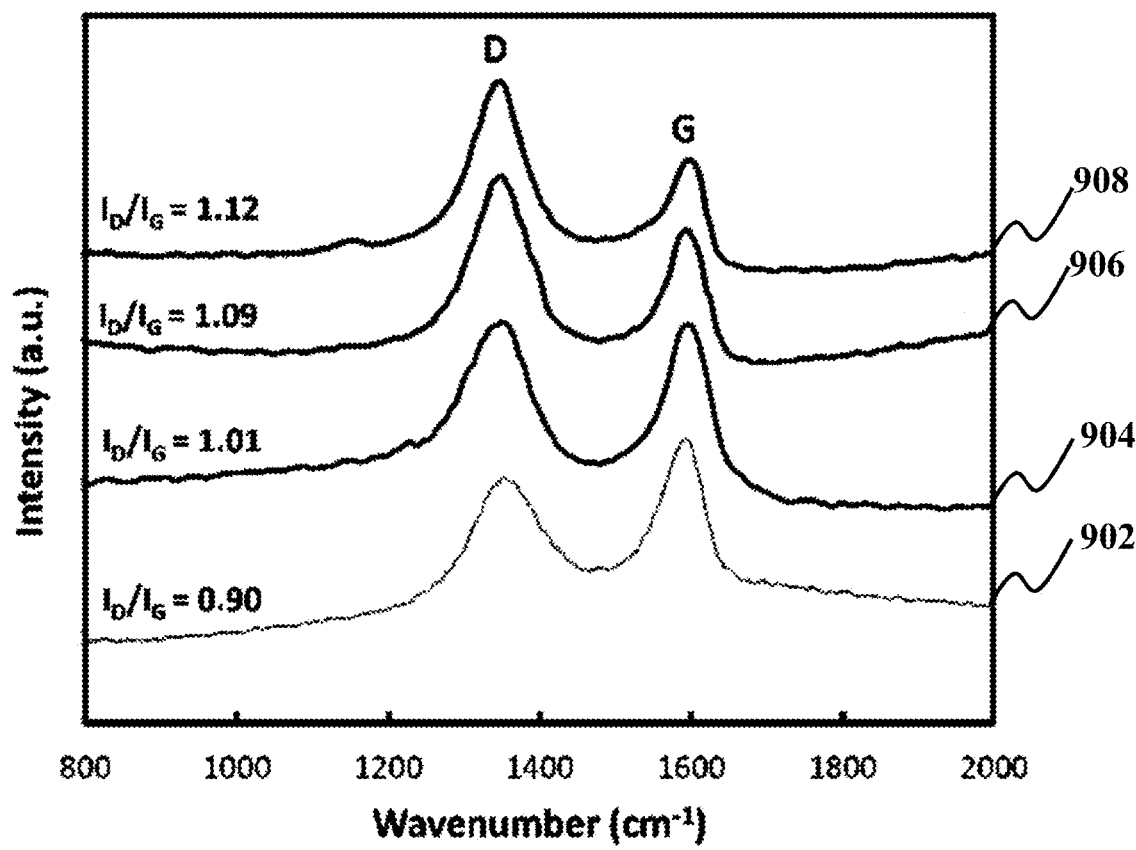
FIG. 9 illustrates patterns of Raman spectroscopy of graphene oxide and partially reduced graphene oxide for different reduction durations, consistent with one or more exemplary embodiments of the present disclosure.

FIG. 9 illustrates patterns of Raman spectroscopy of graphene oxide and partially reduced graphene oxide for different reduction durations, consistent with one or more exemplary embodiments of the present disclosure. FIG. 9 shows that after passing time the G peak may decrease and the D peak may increase. The intensity of $$\frac{I_D}{I_G}$$

may increase when graphene oxide is more reduced which may be the result of eliminating oxygen functional groups from the hexagonal structure of the graphene oxide. Pattern 902, 904, 906, and 908 are for graphene oxide and partially reduced graphene oxides with 1 hour, 2 hours, and 3 hours reduction times, respectively.

Figure 10:
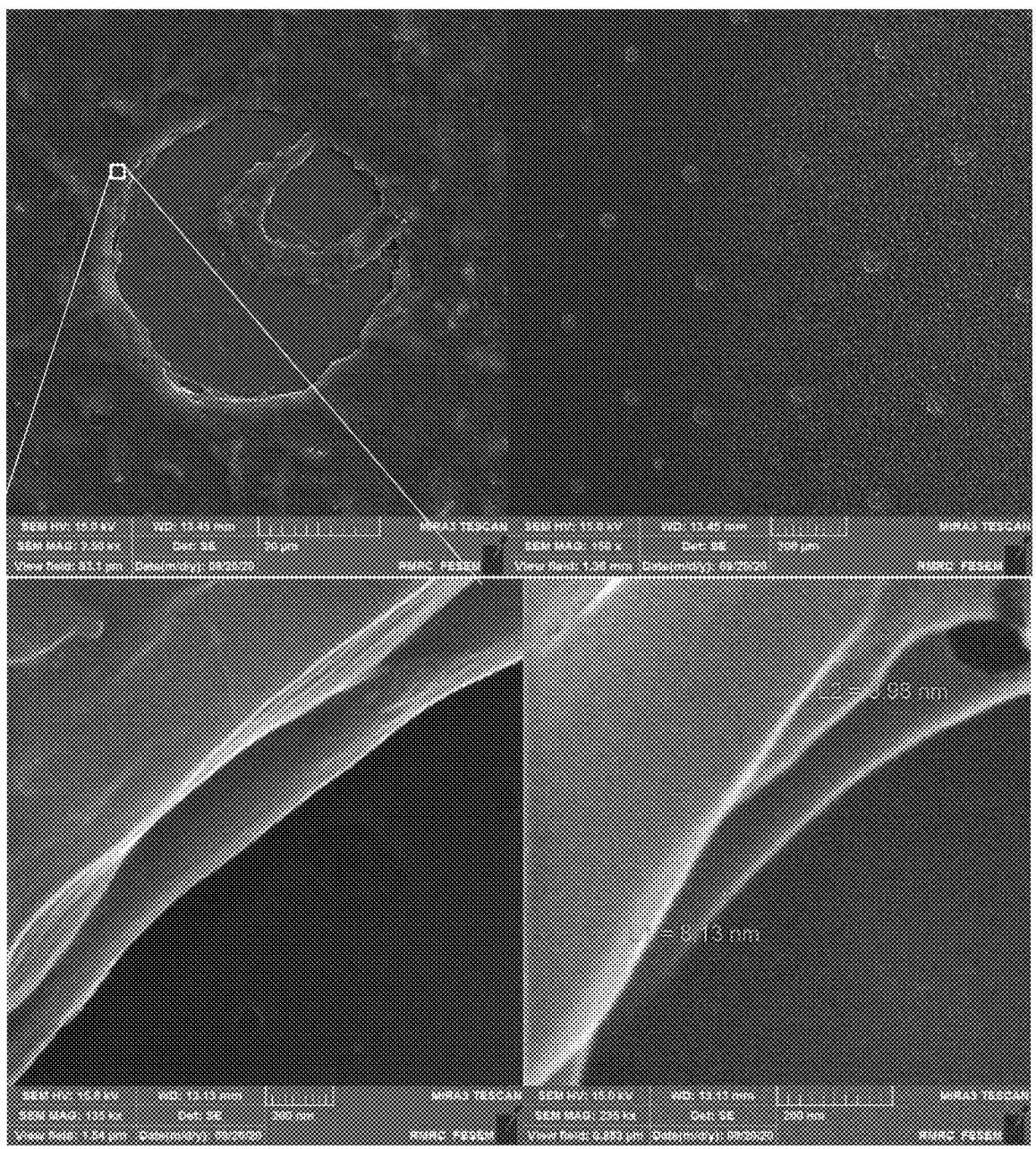
FIG. 10 illustrates field emission scanning electron microscopy (FE-SEM) images of a colloidal aphron/graphene hybrid fluid composition, consistent with one or more exemplary embodiments of the present disclosure.

FIG. 10 illustrates field emission scanning electron microscopy (FE-SEM) images of a colloidal aphron/graphene hybrid fluid composition, consistent with one or more exemplary embodiments of the present disclosure. Image 1002 shows different magnifications of the aphrons where partially reduced graphene oxide are noticeable. Forming the layers of partially reduced graphene oxide over the aphrons may produce a hydrogel with low penetration coefficient. The existence of the partially reduced graphene oxide hydrogel may be a reason for the small size and high stability of the aphrons.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for producing a colloidal aphron/graphene hybrid fluid composition, the method comprising:
    forming a first mixture by mixing a graphene derivative solution and a biopolymer solution, the biopolymer solution comprising at least one of polyvinyl alcohol, carboxymethylcellulose, starch and starch derivatives, chitosan, hyaluronan, xanthan, hydroxypropyl cellulose, polyethylene glycol, polyanionic cellulose, poly(vinyl pyridine), hydrolyzed polyacrylamide, poly(acrylic acid), polyoxyethylene-polyoxypropylene block copolymer, and polyacrylamide, wherein the graphene derivative solution comprises graphene oxide, forming the first mixture further comprising forming a graphene oxide aqueous solution by mixing the graphene oxide and water in an ultrasonic device with an ultrasonic power in a range of 50 W to 100 W for 10 minutes to 30 minutes; and
    forming a second mixture by mixing the first mixture with at least one of an ionic-surfactant solution and a non-ionic surfactant solution, the ionic-surfactant solution comprising at least one of sodium lauryl ether sulfate, linear alkylbenzene sulfonic acid, sodium dodecyl sulfate, sodium dodecylbenzene sulfonate, dodecyltrimethylammonium bromide, and cetyltrimethylammonium bromide, and the non-ionic surfactant solution comprising at least one of polyoxyethylene sorbitan monolaurate, polyoxyethylene sorbitan monopalmitate, polyoxyethylene sorbitan monostearate, polyoxyethylene sorbitan monooleate, sorbitan monolaurate, sorbitan monopalmitate, sorbitan monostearate, sorbitan monooleate, polyoxyethylene octyl phenyl ether, and nonylphenol ethoxylates.

2. The method of claim 1, wherein forming the first mixture comprises mixing the graphene oxide aqueous solution and the biopolymer solution in a mixer with a rotational speed of the mixer in a range of 300 rpm to 500 rpm for 30 minutes to 60 minutes.

3. The method of claim 2, wherein forming the first mixture comprises mixing the graphene oxide aqueous solution and the biopolymer solution in a volume ratio in a range of 1:0.45 to 1:0.9 (graphene oxide aqueous solution:biopolymer solution).

4. The method of claim 1, wherein producing the colloidal aphron/graphene hybrid fluid composition further comprises forming a third mixture by mixing the second mixture with a reducing agent solution, the reducing agent solution comprising at least one of sodium hydroxide, an ammonia solution, an ascorbic acid solution, sodium bisulfate, hydrazine hydrate, and vitamin C.

5. The method of claim 4, wherein forming the third mixture comprises mixing the second mixture with the reducing agent solution in a volume ratio in a range of 1:0.011 to 1:0.059 (second mixture:reducing agent solution).

* * * * *